United States Patent
Fujiyama et al.

(10) Patent No.: US 8,476,479 B2
(45) Date of Patent: Jul. 2, 2013

(54) METHOD OF TREATING BIOMASS, FUEL FOR FUEL CELL, GASOLINE, DIESEL FUEL, LIQUEFIED PETROLEUM GAS, AND SYNTHETIC RESIN

(75) Inventors: Yuichiro Fujiyama, Yokohama (JP); Toshiaki Okuhara, Yokohama (JP); Shigeko Okuhara, legal representative, Fujisawa (JP)

(73) Assignee: Nippon Oil Corporation, Tokyo (JP)

( * ) Notice: Subject to any disclaimer, the term of this patent is extended or adjusted under 35 U.S.C. 154(b) by 691 days.

(21) Appl. No.: 12/377,763

(22) PCT Filed: Aug. 6, 2007

(86) PCT No.: PCT/JP2007/065378
§ 371 (c)(1),
(2), (4) Date: Jun. 11, 2010

(87) PCT Pub. No.: WO2008/020551
PCT Pub. Date: Feb. 21, 2008

(65) Prior Publication Data
US 2011/0113675 A1    May 19, 2011

(30) Foreign Application Priority Data
Aug. 18, 2006    (JP) .................................. 2006-223271

(51) Int. Cl.
*C10L 1/04*    (2006.01)

(52) U.S. Cl.
USPC ........... 585/240; 585/242; 585/638; 585/639; 585/733; 208/113; 44/307; 44/308

(58) Field of Classification Search
USPC .................. 208/113–124; 585/240, 638–639, 585/733; 44/307–308
See application file for complete search history.

(56) References Cited

U.S. PATENT DOCUMENTS

| | | | | |
|---|---|---|---|---|
| 3,293,192 A | * | 12/1966 | Maher | 502/73 |
| 4,102,938 A | | 7/1978 | Rao | |
| 4,693,808 A | * | 9/1987 | Dewitz | 208/113 |
| 4,898,846 A | * | 2/1990 | Edwards et al. | 502/67 |
| 5,314,610 A | * | 5/1994 | Gartside | 208/80 |
| 5,371,248 A | * | 12/1994 | Rudnick | 549/460 |
| 6,538,169 B1 | * | 3/2003 | Pittman et al. | 585/653 |
| 7,282,537 B2 | * | 10/2007 | Kanzaki et al. | 525/95 |
| 2007/0015947 A1 | * | 1/2007 | Marker | 585/648 |

FOREIGN PATENT DOCUMENTS

| | | |
|---|---|---|
| JP | 59-62694 | 4/1984 |
| JP | 61-57686 | 3/1986 |
| JP | 6-510804 | 12/1994 |
| JP | 7-82576 | 3/1995 |
| JP | 8-41468 | 2/1996 |
| JP | 10-152687 | 6/1998 |
| JP | 2003-041268 | 2/2003 |
| JP | 4796401 | 10/2011 |
| JP | 4801983 | 10/2011 |
| JP | 4865311 | 2/2012 |
| WO | WO 2007/064014 A1 | 6/2007 |

OTHER PUBLICATIONS

Rodriguez-Mirasol, J. et al. (1998). Chem. Mater., 10, 550-558.*
F. Twaiq et al., "Catalytic Conversion of Palm Oil to Hydrocarbons: Performance of Various Zeolite Catalysts," Ind. Eng. Chem. Res., vol. 38, No. 9, pp. 3230-3237 (1999).
F. Twaiq et al., "Liquid Hydrocarbon Fuels from Palm Oil by catalytic Cracking over Aluminosilicate Mesoporous Catalysts with Various Si/Al Ratios," Microporous and Mesoporous Materials, vol. 64, No. 1/3, pp. 95-107 (2003).

\* cited by examiner

*Primary Examiner* — Brian McCaig
(74) *Attorney, Agent, or Firm* — Finnegan, Henderson, Farabow, Garrett & Dunner, LLP

(57) ABSTRACT

In processing of biomass by catalytic cracking in a fluidized catalytic cracker having a reaction zone, a separation zone, a stripping zone, and a regeneration zone, the feedstock oil containing the biomass is processed in the reaction zone using a catalyst containing 10 to 50 mass % of ultrastable Y-type zeolite under the conditions: outlet temperature of the reaction zone 580 to 680° C., catalyst/oil ratio 10 to 40 wt/wt, reaction pressure 1 to 3 kg/cm$^2$ G, and contact time of the feedstock oil with the catalyst in the reaction zone 0.1 to 1.0 sec, and the catalyst is then treated in the regeneration zone under the conditions: regeneration zone temperature 640 to 720° C., regeneration zone pressure 1 to 3 kg/cm$^2$ G, and exhaust gas oxygen concentration at the regeneration zone outlet 0 to 3 mol %.

9 Claims, No Drawings

METHOD OF TREATING BIOMASS, FUEL FOR FUEL CELL, GASOLINE, DIESEL FUEL, LIQUEFIED PETROLEUM GAS, AND SYNTHETIC RESIN

CROSS-REFERENCE TO RELATED APPLICATIONS

This application is a national phase application of International Application No. PCT/JP2007/065378, filed Aug. 6, 2007, and claims the priority of Japanese Application No. 2006-223271, filed Aug. 18, 2006, the contents of both of which are incorporated herein by reference.

TECHNICAL FIELD

The present invention relates to a method of processing biomass, and also to the fuel cell fuels, gasoline, diesel fuels, liquefied petroleum gas and synthetic resins obtained thereof.

BACKGROUND ART

Biomass is conventionally viewed as a promising feedstock for producing automobile fuels and petrochemical feedstocks from the viewpoint of energy security and reduction of the amount of carbon dioxide. A number of attempts have been made so far to use biomass as a fuel oil for automobiles, etc. For example, Patent Documents 1 to 5 listed below disclose methods of using biomass, such as vegetable oil and animal fat, as diesel engine fuel after mixing with mineral oil.

However, as described in the aforementioned Patent Documents 1 to 5, when biomass is simply mixed with mineral oil, the fuel obtained has poor stability because of the unsaturated bonds and oxygen present in the biomass, which makes it difficult to manage. Besides, these components pose the risk of adversely affecting the materials used in automobiles.

On the other hand, Patent Document 6 listed below discloses a method of producing gasoline by bringing together a higher fatty acid glycerol ester and a zeolite-containing catalyst.

Patent Document 1: Japanese Patent Laid-Open No. 61-57686
Patent Document 2: National Publication of International Patent Application No. 1994-510804
Patent Document 3: Japanese Patent Laid-Open No. 07-82576
Patent Document 4: Japanese Patent Laid-Open No. 08-41468
Patent Document 5: Japanese Patent Laid-Open No. 10-152687
Patent Document 6: Japanese Patent Laid-Open No. 59-62694

DISCLOSURE OF THE INVENTION

Problems to Solved by the Invention

However, even with the method described in the Patent Document 6, there is room for improvement of the following aspects, for the method to become practically applicable.

Laboratory-scale production of gasoline is possible with the method described in the Patent Document 6. But when processing biomass on an industrial scale in a fluidized catalytic cracker (sometimes referred to as "FCC" hereinafter), the amount of coke produced becomes large compared to processing of vacuum gas oil (hereinafter "VGO"), which is generally used as the mineral oil feedstock for FCC. In FCC, the heat generated in the combustion of coke during regeneration of the catalyst is used for gasification and cracking reactions of the feedstock oil, and the FCC is operated by balancing these. When the heat becomes excessive as a result of increase in coke, it becomes necessary to remove the excess heat by cooling the catalyst or by removing carbon monoxide from the first stage regeneration column in two-stage catalyst regeneration. Each type of FCC has a different capacity to remove excess heat, but it is usual to operate each FCC at the upper limit of its capacity. In addition to this, currently, emission of carbon dioxide is restricted under strengthened environmental regulations, and the amount of coke is a limiting condition for the operation of practically almost all types of FCC. Because of these reasons, if the amount of coke increases due to the introduction of biomass, the severity of the operation is reduced to lower the coke yield, sacrificing the gasoline yield, or the oil feed rate is lowered, both of which are uneconomical.

The present invention was made in the light of the aforementioned problems with the prior art. The purpose of the invention is to provide a method of processing biomass wherein the biomass can be efficiently and stably processed in a fluidized catalytic cracker. Another objective of the present invention is to provide fuel cell fuel, gasoline, diesel fuel, liquefied petroleum gas, and starting materials for synthetic resins, all obtained by the processing of biomass.

Means for Solving the Problems

To solve the aforementioned problems, the present invention provides a method of processing biomass by catalytic cracking in a fluidized catalytic cracker having a reaction zone, a separation zone, a stripping zone, and a regeneration zone. The biomass processing method comprises a first step of processing a feedstock oil containing the biomass in the reaction zone using a catalyst containing 10 to 50 mass % of ultrastable Y-type zeolite, under the conditions: outlet temperature of the reaction zone 580 to 680° C., catalyst/oil ratio 10 to 40 wt/wt, reaction pressure 1 to 3 kg/cm$^2$ G, and contact time of the feedstock oil with the catalyst in the reaction zone 0.1 to 1.0, and a second step of treating the catalyst used in the first step in the regeneration zone under the conditions: regeneration zone temperature 640 to 720° C., regeneration zone pressure 1 to 3 kg/cm$^2$ G, and oxygen concentration of the exhaust gas at the outlet of the regeneration zone 0 to 3 mol %.

In the above-described biomass processing method of the present invention, the increase in coke formation during the processing of the biomass in a fluidized catalytic cracker can be sufficiently suppressed because the biomass-containing feedstock oil is processed under the above-specified conditions using the above-specified catalyst in the reaction zone, and furthermore, the catalyst spent in the process is treated under the above-specified conditions in the regeneration zone. Therefore, the biomass can be efficiently and stably processed in a fluidized catalytic cracker.

It is preferable to use a downflow reactor as the reaction zone in the biomass processing method of the present invention.

Furthermore, it is preferable that the biomass used in the present invention contains an oil and fat component, which is derived from animal or vegetable oils and fats, has 0.1 to 13 mass % of oxygen content, and has a boiling point of 230° C. or higher.

Furthermore, in the present invention, it is preferable that the delta coke on the catalyst is 0.2 to 1.5 mass %.

Furthermore, it is preferable that the difference between the temperature of the catalyst rich phase in the regeneration zone and the outlet temperature of the reaction zone, in the fluidized catalytic cracker, is not more than 150° C.

Furthermore, in the first step of the present invention, it is preferable to spray the feedstock oil into the reaction zone using an amount of steam that is 2 to 8 mass % of the feedstock oil.

It is also preferable that ultrastable Y-type zeolite in catalyst used in the present invention has Si/Al atomic ratio of 3 to 20, more preferably 5 to 20, and even more preferably 7 to 15.

Furthermore, it preferable that the ultrastable Y-type zeolite in the catalyst has crystal lattice constant 24.35 Å or less and crystallinity 90% or higher.

Furthermore, it is preferable that the ultrastable Y-type zeolite in the catalyst has a rare earth metal introduced at its ion exchange site.

Furthermore, it is preferable that the catalyst also contains silica-alumina as an active matrix.

Furthermore, the present invention provides fuel cell fuels characterized by containing hydrogen obtained by the biomass processing method of the present invention.

Furthermore, the present invention provides gasoline characterized by containing a part or whole of the 25 to 220° C. boiling fraction obtained by the biomass processing method of the present invention, or its hydrogenated product.

Furthermore, the present invention provides gasoline characterized by containing ether obtained through the reaction of the isobutylene obtained by the biomass processing method of the present invention, with methanol or ethanol.

Furthermore, the present invention provides gasoline characterized by containing the product of the reaction of butylenes obtained by the biomass processing method of the present invention, with isobutane in an alkylation unit.

Furthermore, the present invention provides gasoline characterized by containing dimers of the butylenes obtained by the aforementioned biomass processing method of the present invention.

Furthermore, the present invention provides diesel fuel characterized by containing a part or the whole of the 170 to 370° C. boiling fraction obtained by the biomass processing method of the present invention.

Furthermore, the present invention provides liquefied petroleum gas characterized by containing hydrocarbons with three or four carbons obtained by the biomass processing method of the present invention.

Furthermore, the present invention provides synthetic resins characterized by containing, as constituent monomers, propylene obtained by the biomass processing method of the present invention. Such synthetic resins are characterized by having carbon dioxide emission that can be counted as zero according to environmental regulations, when disposed off, preferably through combustion.

Effect of the Invention

The present invention provides a method of processing biomass, in which the biomass can be processed efficiently and stably in a fluidized catalytic cracker. Furthermore, the use of the biomass processing method of the present invention provides fuels and petrochemical feedstocks which are useful from the point of view of energy security and reducing the amount of carbon dioxide.

BEST MODE FOR CARRYING OUT THE INVENTION

The preferred embodiment of the present invention is described below in detail.

In the present invention, biomass-containing feedstock oil is used as the starting material. Oil and fat of plant or animal origin may be used as the biomass. Such oil or fat includes esters of a higher fatty acid and glycerol, and specific examples include vegetable oils like palm oil, rapeseed oil, corn oil, soybean oil, and grapeseed oil, and animal fats like lard, etc. These oils and fats can be used ones. It is preferable that such biomass contains the fat and oil fraction of boiling point 230° C. or higher. Such biomass can be used in the form of mixtures.

In the present invention, the feedstock oil can be the aforementioned types of biomass alone or it can be a mixture of such biomass with mineral oil. Examples of mineral oil include the atmospheric residue oil obtained in the distillation of crude oil, vacuum gas oil and vacuum residue oil obtained by vacuum distillation of the atmospheric residue oil, their hydrotreated oils, pyrolysis oils, and or their mixtures. Among these mineral oils, the atmospheric residue oil, vacuum residue oil, and their hydrotreated products or pyrolysis products are referred to as residue oils in the present invention. The proportion of residue oil in the feedstock oil, expressed as the mass ratio, is referred to as the "residue oil ratio" (mass %).

There is no particular restriction for the residue oil ratio in the present invention. However, it is preferable to apply the biomass processing method of the present invention in a fluidized catalytic cracker that is being operated with a feedstock oil having a residue oil ratio of 10 mass % or more. Furthermore, a residue oil ratio of 30 mass % or more is preferable.

The catalyst (fluidized catalytic cracking catalyst) used in the present invention contains 10 to 50 mass %, preferably 15 to 40 mass % of ultrastable Y-type zeolite. It is preferable to use ultrastable Y-type zeolite having Si/Al atomic ratio 3 to 20. The more preferable Si/Al atomic ratio is 5 to 20, and 7 to 15 is even more preferable. When the Si/Al atomic ratio is less than 3, the catalytic activity becomes excessive, and the amount of gas and LPG generated invariably increases. On the other hand, when the Si/Al atomic ratio is more than 20, the cost of the zeolite increases, which is not economically desirable.

Furthermore, ultrastable Y-type zeolite having a crystal lattice constant of 24.35 Å or less, and crystallinity 90% or higher is preferably used. Furthermore, an ultrastable Y-type zeolite with a rare earth metal introduced at its ion exchange site is used preferably.

The suitable forms of the catalyst used in the present invention include those wherein the ultrastable Y-type zeolite is molded with a binder into particles, along with a matrix, which is a secondary active component that can crack large molecules of heavy oil, and a bulking agent such as kaolin. Silica-alumina is preferable as the matrix component of the catalyst used in the present invention. Such a catalyst preferably has a mean particle size of 50 to 90 μm, bulk density 0.6 to 0.9 g/cm$^3$, surface area 50 to 350 m$^2$/g, and pore volume 0.05 to 0.5 ml/g.

Furthermore, such catalysts can contain, apart from the ultrastable Y-type zeolite, crystalline aluminosilicate zeolite of smaller pore size than the Y-type zeolite, silico-alumino phosphate (SAPO), etc. An example of crystalline aluminosilicate zeolite is ZSM-5, and examples of SAPO include SAPO-5, SAPO-11, and SAPO-34. These zeolites and SAPO can be in the same catalyst particles that contain the ultrastable Y-type zeolite, or in separate catalyst particles.

There is no particular restriction on the FCC used in the present invention as long as it has a reaction zone, separation zone, stripping zone, and regeneration zone. Besides this, the FCC can be an existing unit that has been in use for processing mineral oil, or one that has been newly constructed for processing biomass.

In the reaction zone of the FCC in the present invention, fluidized catalytic cracking is done under the conditions: outlet temperature of the reaction zone 580 to 680° C., catalyst/oil ratio 10 to 40 wt/wt, reaction pressure 1 to 3 kg/cm² G, and contact time of the feedstock oil with the catalyst 0.1 to 1.0 seconds. In the present invention, "fluidized catalytic cracking" means that a heavy feedstock oil such as the aforementioned biomass and mineral oil is brought into contact with a fluidized catalyst to crack the heavy feedstock oil into gasoline and light hydrocarbons mainly comprising light olefins. The so-called riser cracking, wherein the catalyst particles and feedstock oil rise together in a tube, is often used for such fluidized catalytic cracking. A downflow reactor wherein the catalyst particles and feedstock oil flow down together in a tube can also be suitably used for the present invention. A phenomenon called back mixing occurs in riser cracking, and this widens the distribution of residence time of the catalyst and feedstock, making it prone to the formation of coke and dry gas. Such back mixing is suppressed in downflow reactors.

In the present invention, "outlet temperature of the reaction zone" means the outlet temperature of the fast moving bed reactor, i.e., the aforementioned riser cracking or downflow reactor, and this is the temperature before the cracked products are quenched or separated from the catalyst. The outlet temperature of the reaction zone in the present invention is 580 to 680° C., as described earlier, preferably 590 to 650° C., and more preferably 600 to 630° C. If the outlet temperature of the reaction zone is lower than 580° C. the desired products, such as gasoline and light olefins, cannot be obtained at high yields. On the other hand, if it is higher than 680° C., thermal decomposition becomes prominent, which increases dry gas generation.

The "catalyst/oil ratio" in the present invention, is the ratio of the catalyst circulation rate (ton/h) over the feed rate of the feedstock oil (ton/h). In the present invention, the catalyst/oil ratio is 10 to 40 wt/wt, as described earlier. The preferable ratio is 15 to 35 wt/wt, 20 to 30 wt/wt being more preferable. Satisfactory cracking ratio cannot be achieved when the catalyst/oil ratio is less than 10 wt/wt; when it exceeds 40 wt/wt, the catalyst circulation rate becomes large, and the catalyst residence time needed for regeneration of the catalyst in the regeneration zone cannot be ensured. Besides, the regeneration temperature is also reduced, which makes the regeneration of the catalyst insufficient. In the present invention, by keeping the catalyst/oil ratio high at 10 to 40 wt/wt, the system can be enabled to cope with coke deficiency during the processing of synthetic oil.

"Reaction pressure" in the present invention is the total pressure in the fluidized bed reactor. The reaction pressure in the present invention is 1 to 3 kg/cm² G, as mentioned earlier, preferably 1.2 to 2 kg/cm² G. With a reaction pressure of less than 1 kg/cm² G, the difference from atmospheric pressure would be very small, making it difficult to regulate the pressure with a control valve. Besides this, a reaction pressure of less than 1 kg/cm² G would make the pressure in the regeneration zone also small, which would necessitate the use of a large vessel for regeneration to ensure the required residence time of the gas, which is not economically desirable. On the other hand, with a reaction pressure higher than 3 kg/cm² G, the proportion of bimolecular reactions, such as the hydrogen transfer reaction, increases with respect to the cracking reaction, which is a single molecule reaction. Here, "hydrogen transfer reaction" means the reaction where an olefin receives hydrogen from a naphthene, etc to get converted into paraffin. This reaction can cause reduced production of light olefin, a desired product, and lowering of the octane number of gasoline, etc.

In the present invention, the "contact time of the feedstock oil with the catalyst" means the time from the point that the feedstock oil comes into contact with the catalyst at the reactor inlet to the point where the reaction product is separated from the catalyst at the reactor outlet. The contact time of the feedstock oil with the catalyst in the present invention is 0.1 to 1.0 seconds, as mentioned earlier, preferably 0.3 to 0.7 seconds. If the contact time is less than 0.1 sec, the cracking does not advance well. On the other hand, a contact time of more than 1.0 sec promotes excessive cracking, and undesirable secondary reactions like hydrogen transfer, which reduce the yield of the desired product.

In the present invention, it is preferable to spray the feedstock oil, using steam, when introducing it into the reaction zone. Here, the preferable amount of steam to be used is 2 to 8 mass % with respect to the feedstock oil. If the amount of steam is less than 2 mass % with respect to the feedstock oil, the size of the sprayed droplets would not be sufficiently small, which would not give satisfactory contact between the droplets and the catalyst, and tend to lower the reaction efficiency. On the other hand, with higher than 8 mass %, a large amount of water needs to be recovered in the product recovery zone discussed later, which is not economically desirable.

In the present invention, the mixture of products of catalytic cracking in the reaction zone, unreacted substances, and catalyst is sent to the separation zone, where the catalyst is separated from the mixture. A solid-liquid separator that uses centrifugal force, such as a cyclone, is preferably used as the separation zone.

In the present invention, the catalyst separated in the separation zone is sent to the stripping zone where most of the hydrocarbons, like the products, unreacted hydrocarbons, etc are removed from the catalyst particles. On the other hand, a part of the feedstock turns into heavier carbonaceous material (coke) during the reaction, and deposits on the catalyst. Such catalyst particles with coke and a part of the heavy hydrocarbons are sent from the stripping zone to the regeneration zone (regeneration column).

In the regeneration zone of the FCC unit used in the present invention, the catalyst from the stripping zone is treated under the conditions: regeneration zone temperature 640 to 720° C., regeneration zone pressure 1 to 3 kg/cm² G, and oxygen concentration in the exhaust gas at the regeneration zone outlet 0 to 3 mol %.

To supply the necessary heat to the regeneration zone of the FCC unit in the present invention, it is preferable to feed into the regeneration zone the atmospheric residue oil obtained by treating crude oil in atmospheric distillation unit to the extent of 1 to 10 mass % with respect to the weight of the feedstock oil fed into the reaction zone.

The regeneration zone temperature in the present invention is 640 to 720° C. as described earlier, preferably 650 to 710° C., and more preferably 660 to 700° C. When the temperature in the regeneration zone is less than 640° C., the combustion of the coke is insufficient, and when it exceeds 720° C. the deterioration of the catalyst is promoted. Besides this, costlier materials would have to be used for the regeneration zone to be able to withstand such temperatures, which is not economically desirable.

In the present invention, it is preferable that the difference between the temperature of the catalyst-rich phase of the regeneration zone and the outlet temperature of the reaction zone is within 150° C. When this temperature difference exceeds 150° C., the exhaust gas from the regeneration column carries away a large amount of heat to outside the system, making it difficult to maintain a suitable reaction temperature.

Here, the "temperature of the catalyst-rich phase of the regeneration zone" means the temperature of the catalyst particles flowing in a concentrated manner in the regeneration zone just before they exit that zone.

The pressure in the regeneration zone in the present invention is 1 to 3 kg/cm$^2$ G, as described earlier. When this temperature is less than 1 kg/cm$^2$ G, a large vessel is needed for the regeneration zone to ensure the gas residence time required for regeneration, which is not economically desirable. When this temperature exceeds 3 kg/cm$^2$ G, the pressure in the reaction zone increases correspondingly, which is not desirable, as such conditions promote undesirable bimolecular reactions, such as hydrogen transfer, in the reaction zone.

In the present invention, the oxygen concentration in the exhaust gas at the outlet of the regeneration zone is 0 to 3 mol %. Oxygen concentration exceeding 3 mol % means that an excess of air is being sent to the regeneration zone, with expenditure of extra energy, which is not economically desirable.

After the aforementioned oxidation treatment, the catalyst becomes the regenerated catalyst. The coke and heavy hydrocarbons deposited on the catalyst have been decreased by the combustion. This regenerated catalyst is continuously circulated back to the reaction zone. In some cases, in order to suppress needless pyrolysis or excessive cracking, the cracked product is quenched immediately upstream or immediately downstream of the separation zone. The catalyst is heated by the heat generated from the combustion of the carbonaceous material in the regeneration zone, and this heat is carried, along with the catalyst, into the reaction zone. This heat is then used for heating and gasification of the feedstock oil. The cracking reaction is an endothermic reaction. Therefore, this heat is also used as the heat needed for the cracking reaction. Thus, the exotherm in the in the regeneration zone and the endotherm in the reaction zone are essential requirements for FCC operation.

Cooling of the catalyst is a measure adopted when the heat becomes excessive. In this method, a part of the catalyst in the regeneration zone is taken out and the heat of this catalyst is removed by using it for steam generation, etc. Another measure against excessive heat is to separate the regeneration zone into two stages, and operate the first stage regeneration zone under a hypoxic atmosphere. In this case, the combustion of coke in the first stage of the regeneration zone is incomplete combustion, and carbon monoxide comes out as the exhaust gas. The difference between the heat of reaction in the oxidation of carbon into carbon monoxide and the heat of reaction of carbon into carbon dioxide can thus be taken out of the system as excess heat. The carbon monoxide exhausted from system can then be oxidized to carbon dioxide and the energy can be recovered as electric power or steam.

The upper limit of the amount of coke produced during the catalytic cracking is generally determined for each FCC unit. For example, the permissible level of the amount of coke is determined by the amount of heat that can be taken out using the measures against excess heat described above. Furthermore, in some cases, the upper limit of the amount of carbon dioxide generated is determined by the location of the FCC unit, and the permissible limit of the amount of coke is restricted accordingly. Usually, the FCC unit is operated under as large an oil feed rate and as high a cracking ratio as possible. As a result, it is operated at the upper limit of the amount of coke.

However, when a conventional oxygen-containing feedstock derived from biomass is processed in the FCC, invariably the amount of coke produced becomes larger compared to when using vacuum gas oil (hereinafter sometimes referred to as "VGO"), which is generally used along with mineral oil-type FCC feedstock. Contrary to this, in the present invention, the increase in coke formation can be sufficiently suppressed, and operation at the upper limit of coke production can be maintained, as the feedstock comprising biomass and mineral oil is processed under the above-specified conditions using the above-specified catalyst, and the catalyst used for the processing is treated under the above-specified conditions in the regeneration zone.

In the present invention, the amount (mass %) of coke formed with respect to the amount of feedstock oil is referred to as "coke yield". The suitable coke yield in the present invention is 4 to 15 mass %, more preferably 6 to 11 mass %, and even more preferably 7 to 10 mass %. When the coke yield is less than the aforementioned lower limit, the heat tends to become insufficient for the reaction. On the other hand, when the coke yield exceeds the aforementioned upper limit, the heat produced in the regeneration zone becomes excessively large, which poses operational restrictions such as lowering of the cracking ratio, the oil feed rate, etc., which is not desirable.

In the present invention, the suitable amount of delta coke delta coke is less than 0.2 mass %, the heat tends to be less than what is required for the reaction. On the other hand, if the delta coke exceeds-1.5 mass %, the heat generated in the regeneration zone becomes excessive, posing operational restrictions such as lowering of the cracking ratio, oil feed rate, etc., which is not desirable. Here "delta coke" means the value expressed by the equation shown below. In the below-given equation, "amount of coke deposited" and "residual amount of coke" are both the proportion (mass %) of the coke with respect to the weight of the catalyst.

(Delta coke)=(Amount of coke deposited on the catalyst before the regeneration treatment(mass %))−(Residual amount of coke on the catalyst after the regeneration treatment(mass %))

Furthermore, it is preferable that the FCC used in the present invention has a cracked product recovery zone. Such a product recovery zone can be a cracked product recovery facility that recovers the cracked products by separating them according to their boiling point. Such a cracked product recovery facility comprises a plurality of distillation columns, absorption columns, compressors, strippers, heat exchangers, etc. The product formed in the reaction zone passes through the aforementioned separation zone and is sent to the first distillation column (the distillation column that is most upstream). Here, the heat is removed from the product by a heat exchanger, and the gas oil and the fraction heavier than the gas oil are removed from the bottom of the column, and the gasoline and fractions lighter than gasoline are removed from the top of the column. Alternatively, the column, and only heavy oil from the bottom of the column. The light fraction obtained from the first distillation column is sent to a compressor for compression. After that it is passed through plural numbers of absorption columns and distillation columns, installed downstream of the first distillation column, and separated and recovered as gasoline, C4 fraction, C3 fraction, and dry gas.

Here, "C4 fraction" means the hydrocarbons with carbon number four, butanes and butylenes. "C3 fraction" means the hydrocarbons with carbon number three, propane and propylene. "Dry gas" means the hydrocarbons with carbon number two or less, methane and ethylene and gasses with smaller molecular weight than these, like hydrogen. Sometimes, depending on the capacity of the distillation columns, a part of the C4 fraction gets intermixed with gasoline, or a part of the C4 fraction gets intermixed with the C3 fraction.

In the first distillation column, the temperature at and around the column top is lower than the dew point of water. Therefore, in the conventional method of processing biomass, corrosion of the equipment by the acids in the condensed water, originating from the esters (oil and fat) in the biomass has been a problem. Contrary to this, in the biomass processing method of the present invention, such corrosion is well-suppressed, as the acids originating from the biomass are decomposed.

As described above, with the biomass processing method of the present invention, it is possible to process biomass efficiently and stably in a fluidized catalytic cracker.

The biomass processing method of the present invention uses biomass as the feedstock, and therefore, is superior from the viewpoints of energy security and reducing the amount of carbon dioxide. Thus, it is very useful for production of base materials for various fuels and feedstocks of petrochemical products.

For example, the hydrogen obtained by the biomass processing method of the present invention can be used as a fuel cell fuel.

Furthermore, the 25 to 220° C. boiling fraction obtained by the biomass processing method of the present invention can be used as a gasoline base. The 25 to 220° C. boiling fraction can be used in the form of a gasoline base containing a part or the whole of the fraction or its hydrogenated product.

Furthermore, the 170 to 370° C. boiling fraction obtained in the biomass processing method of the present invention can be used as a diesel fuel base. Here, a part or the whole of this fraction can be used as the diesel fuel base.

Furthermore, the hydrocarbons with three or four carbons obtained in the biomass processing method of the present invention can be used as a liquefied petroleum gas base.

Furthermore, the propylene obtained in the biomass processing method of the present invention can be used as a constituent monomer in synthetic resins. As such synthetic resins use biomass as the feedstock, they have the advantage of having a carbon dioxide emission, when disposed off by combustion, that can be counted as zero according to environmental regulations.

Furthermore, the ether obtained through reaction of isobutylene obtained in the biomass processing method of the present invention with methanol or ethanol can be used as a gasoline base.

Furthermore, the reaction product obtained by reacting butylenes obtained in the biomass processing method of the present invention with isobutane in an alkylation unit can be used as a gasoline base.

Furthermore, dimers of butylenes obtained by the biomass processing method of the present invention can be used as a gasoline base.

EXAMPLES

The present invention is described more specifically below, citing examples and comparative examples. However, the scope of the present invention is not restricted in any way by the examples given here.

Example 1

21550 g of dilute JIS No. 3 water glass solution ($SiO_2$ concentration 11.6%) was added drop-wise into 3370 g of 40% sulfuric acid to obtain silica gel of pH 3.0. 3000 g of ultrastable Y-type zeolite (HSZ-370HUA, manufactured by Tosoh Co.) and 4000 g of kaolin were added to the entire amount of the silica gel, blended, and spray-dried in 250° C. hot air flow. The spray-dried substance thus obtained was then washed with 0.2% ammonium sulfate at 50° C., and dried in a 110° C. oven. A catalyst was obtained by further calcining it at 600° C. The catalyst had 30 mass % of ultrastable Y-type zeolite with Si/Al atomic ratio 10, crystal lattice constant 29.33, and crystallinity 97%. The catalyst particles had bulk density 0.7 g/ml, mean particle size 71 μm, BET specific surface area 180 $m^2/g$, and pore volume 0.12 ml/g. Silica-alumina was used as the active matrix.

The biomass cracking reaction was carried out using the catalyst prepared above, in a fluidized catalytic cracker. For the fluidized catalytic cracker, an FCC pilot unit (manufactured by Xytel Corporation) having a downflow reaction column, and adiabatic reaction zone and regeneration zone. Biomass, which as a mixture of soybean oil and rapeseed oil (hereinafter referred to as "feedstock oil A"), was used as the feedstock oil. The properties of the feedstock oil A are given in Table 1. The catalyst was equilibrated in a pseudo way before loading in the aforementioned cracker by 100% steaming treatment at 800° C. for 6 hours. Here, the scale of the cracker was 2 kg of inventory (total amount of catalyst), and a feed rate of 1 kg/hour. The operating conditions of the cracker were catalyst/feedstock oil ratio 20, outlet temperature of reaction zone 600° C., and contact time 0.5 sec. The feedstock oil was supplied to the reaction zone by spraying it, along with an amount of steam equal to 5 mass % of the feedstock oil, into the reaction zone.

Table 2 gives the conversion of feedstock oil into the cracked products, yield of the cracked products, the delta coke, and the research method octane number of the gasoline, obtained in the aforementioned catalytic cracking. In Table 2, the yield of cracked products are given as mass ratio with respect to the feedstock oil, expressed as percentage. C1 stands for methane gas and C2 for ethane gas (the same symbols are used hereinafter).

Example 2

The catalyst was prepared as in Example 1, and catalytic cracking of the feedstock oil A was done as in Example 1 except for using an octane enhancing additive (Olefinsmax, manufactured by GRACE Davison) to the extent of 20% of the inventory (the sum total of catalyst and additive). The conversion of feedstock oil into the cracked products, yield of the cracked products, delta coke, and the research method octane number of the gasoline obtained are given in Table 2.

Comparative Example 1

Catalytic cracking was done as in Example 1 except for using desulfurized VGO of Middle East origin (feedstock oil B) instead of the feedstock oil A. The properties of feedstock oil B are given in Table 1, and conversion of feedstock oil into the cracked products, yield of cracked products, delta coke, and the research method octane number of the gasoline obtained are given in Table 2.

Comparative Example 2

Catalytic cracking was done as in Example 2 except for using feedstock oil B instead of feedstock oil A. The conversion of feedstock oil into cracked products, yield of cracked products, delta coke, and the research method octane number of the gasoline obtained are given in Table 2.

Comparative Example 3

Catalytic cracking of feedstock oil A was done as in Example 1 except for using catalyst/feedstock oil ratio 5.5, reaction zone outlet temperature 500° C., and contact time 2 sec. The conversion of feedstock oil into cracked products, yield of cracked products, delta coke, and the research method octane number of the gasoline obtained are given in Table 2.

TABLE 1

|  |  | Feedstock oil A | Feedstock oil B |
|---|---|---|---|
| Type |  | Mixture of soybean oil and rapeseed oil | Desulfurized VGO of Middle East origin |
| Density at 15° C. (g/cm$^3$) |  | 0.9126 | 0.8972 |
| Mean molecular mass |  | 880 | 440 |
| Composition (element analysis) | C (mass %) | 73.58 | 86.80 |
|  | H (mass %) | 15.53 | 13.10 |
|  | O (mass %) | 10.89 | 0.00 |
|  | N (mass %) | 0.00 | 0.07 |
|  | S (mass %) | 0.00 | 0.15 |

TABLE 2

|  |  | Example 1 | Example 2 | Comparative Example 1 | Comparative Example 2 | Comparative Example 3 |
|---|---|---|---|---|---|---|
| Reaction zone outlet temperature (° C.) | | 600 | 600 | 600 | 600 | 500 |
| Regeneration zone catalyst rich phase temperature (° C.) | | 700 | 700 | 700 | 700 | 700 |
| Amount of additive used (mass %) | | 0 | 25 | 0 | 25 | 0 |
| Catalyst/oil ratio (mass ratio) | | 20 | 20 | 20 | 20 | 5.5 |
| Contact time (sec) | | 0.5 | 0.5 | 0.5 | 0.5 | 2 |
| Conversion (mass %) | | 82.9 | 83.7 | 84.9 | 86.0 | 68.1 |
| Cracked product yield (mass %) | Dry gas (H2, C1 and C2) | 2.5 | 1.9 | 2.7 | 2.2 | 0.6 |
| | Ethylene | 1.6 | 3.8 | 1.7 | 4.1 | 0.4 |
| | Propylene | 8.1 | 16.1 | 10.5 | 19.7 | 3.1 |
| | Butylene | 9.3 | 11.1 | 15.2 | 16.0 | 4.5 |
| | Propane and butane | 3.9 | 4.7 | 5.1 | 5.2 | 2.4 |
| | Gasoline | 48.3 | 37.2 | 41.2 | 30.6 | 51.0 |
| | Light cycle oil (LCO) | 13.6 | 12.9 | 8.9 | 8.1 | 15.0 |
| | Slurry oil (SLO) | 3.5 | 3.4 | 6.2 | 5.9 | 16.9 |
| | Coke | 9.2 | 8.9 | 8.5 | 8.2 | 6.1 |
| | Water | 10.9 | 10.9 | 0.00 | 0.00 | 10.5 |
| Delta coke (mass %) | | 0.46 | 0.45 | 0.43 | 0.41 | 1.11 |
| Research method octane number | | 90.3 | 94.0 | 97.1 | 101.0 | 78.0 |

We can see from the results given in Table 2 that cracked gasoline with a high octane number and light olefins can be obtained by cracking biomass under the aforementioned reaction conditions using a catalyst containing ultrastable Y-type zeolite. It can also be seen from the results of Example 2 that the combined use of a catalyst containing ultrastable Y-type zeolite and an octane enhancing additive improves the octane number of the cracked gasoline, while at the same time increasing the yield of light olefins with higher added value.

Furthermore, we can see that the gasoline yield was higher by more than 5 mass % in examples 1 and 2 than in the comparative examples 1 and 2 where delsulfurized VGO of Middle East origin was processed. In addition to this, the research method octane number of the cracked gasoline obtained in examples 1 and 2 was 90 to 94, which was sufficiently high for practical applications.

Comparative Example 3 corresponds to cracking under conditions similar to conventional FCC, i.e., a catalyst/feedstock oil ratio 5.5, reaction zone outlet temperature 500° C., and contact time 2 sec. In this comparative example, the yield of cracked gasoline was comparable, but the research method octane number of the gasoline was only 78, and therefore, the cracked gasoline cannot be considered to have satisfactory properties for practical application as such.

The invention claimed is:

1. A method of processing biomass by catalytic cracking in a fluidized catalytic cracker having a reaction zone, a separation zone, a stripping zone, and a regeneration zone, the method comprising:
   a first step of processing a feedstock oil containing the biomass in the reaction zone using a catalyst containing 10 to 50 mass % of ultrastable Y-type zeolite under the conditions of outlet temperature of the reaction zone 580 to 680° C., catalyst/oil ratio 10 to 40 wt/wt, reaction pressure 1 to 3 kg/cm$^2$ G, and contact time of the feedstock oil with the catalyst in the reaction zone 0.1 to 1.0 sec, wherein the feedstock oil is sprayed into the reaction zone using steam in an amount of 2 to 8 mass % of the feedstock oil; and
   a second step of treating the catalyst used in the first step in the regeneration zone under the conditions: regeneration zone temperature 640 to 720° C., regeneration zone pressure 1 to 3 kg/cm$^2$ G, and exhaust gas oxygen concentration at the regeneration zone outlet 0 to 3 mol %.

2. The biomass processing method according to claim 1, wherein a downflow reactor is used as the reaction zone.

3. The biomass processing method according to claim 1, wherein the biomass contains an oil and fat component, which is derived from animal or vegetable oils and fats, has 0.1 to 13 mass % of oxygen content, and has a boiling point of 230° C. or higher.

4. The biomass processing method according to claim 1, wherein the delta coke on the catalyst is 0.2 to 1.5 mass %.

5. The biomass processing method according to claim 1, wherein the difference between the temperature of the catalyst rich phase of the regeneration zone and the outlet temperature of the reaction zone, in the fluidized catalytic cracker, is not more than 150° C.

6. The biomass processing method according to claim 1, wherein the Si/Al atomic ratio of the ultrastable Y-type zeolite in the catalyst is 3 to 20.

7. The biomass processing method according to claim 1, wherein the ultrastable Y-type zeolite in the catalyst has crystal lattice constant 24.35 Å or less, and crystallinity 90% or higher.

8. The biomass processing method according to claim 1, wherein the ultrastable Y-type zeolite in the catalyst has a rare earth metal introduced at its ion exchange site.

9. The biomass processing method according to claim 1, wherein the catalyst further contains silica-alumina as an active matrix.

* * * * *